J. E. FEENEY.
APPARATUS FOR LUBRICATING THE FLANGES OF VEHICLE WHEELS.
APPLICATION FILED DEC. 19, 1911.

1,060,174.

Patented Apr. 29, 1913.

3 SHEETS—SHEET 1.

Witnesses

Inventor:
James E. Feeney
by B. Singer
Atty

J. E. FEENEY.
APPARATUS FOR LUBRICATING THE FLANGES OF VEHICLE WHEELS.
APPLICATION FILED DEC. 19, 1911.
1,060,174.
Patented Apr. 29, 1913.
3 SHEETS—SHEET 2.
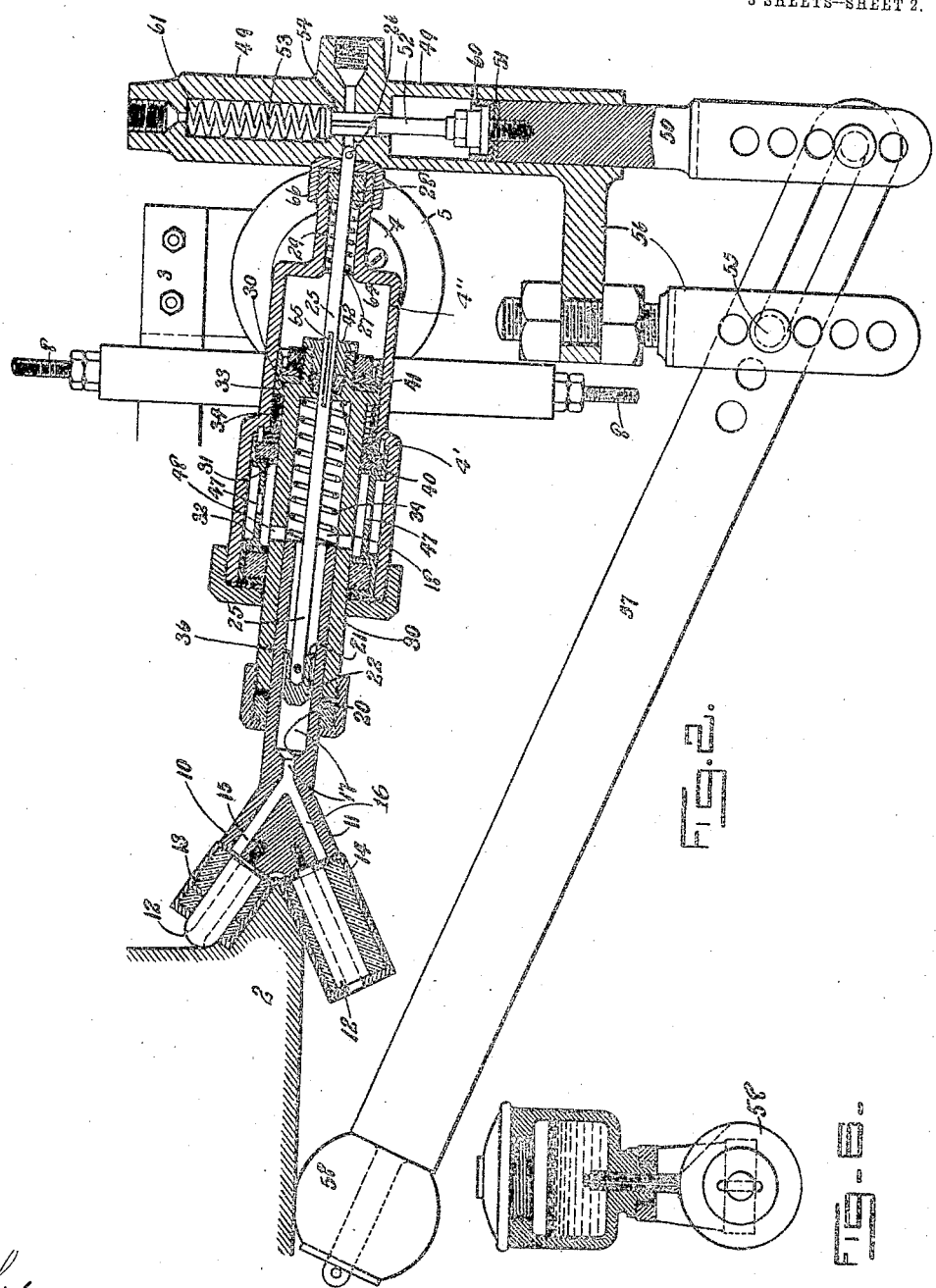

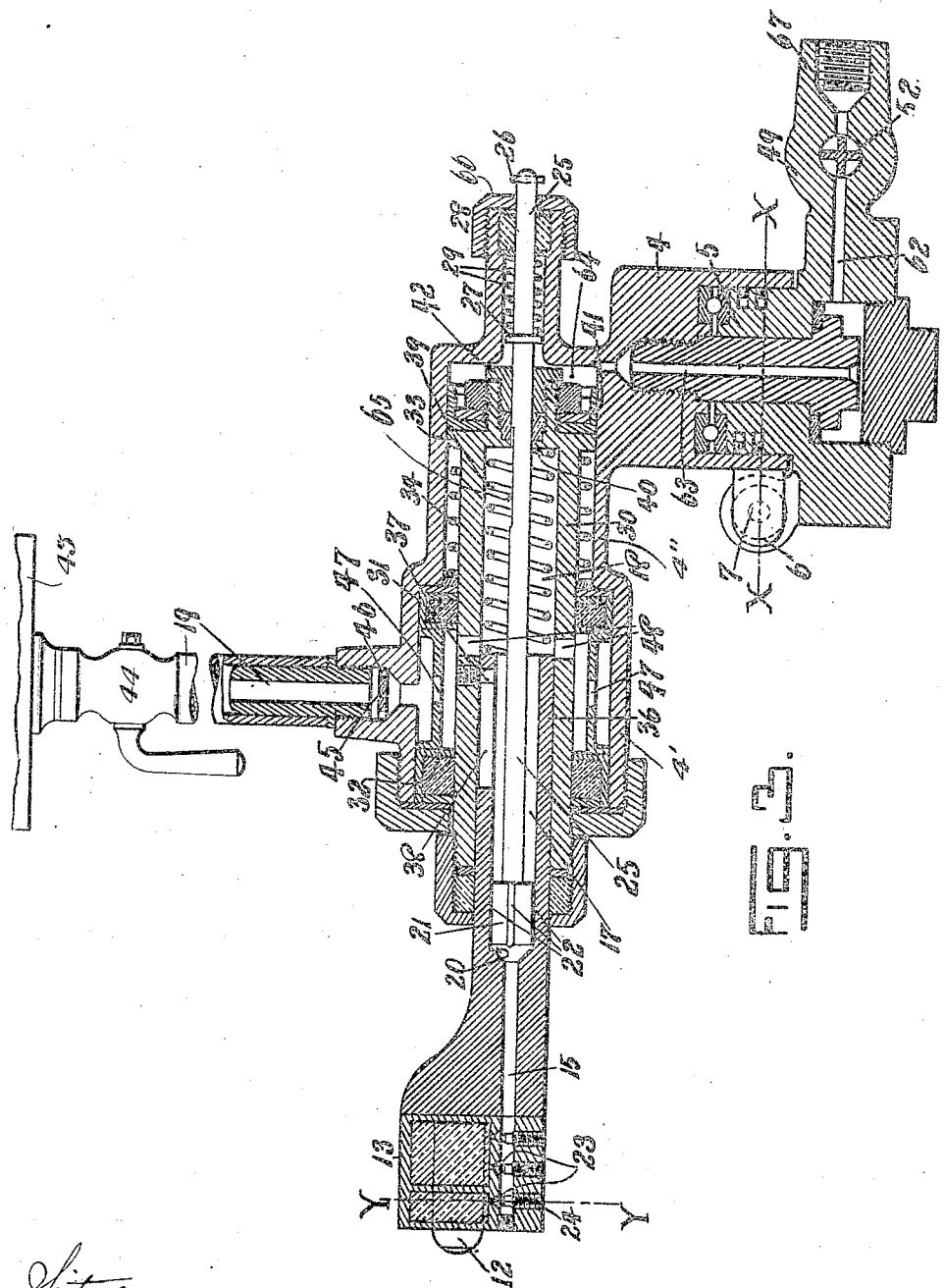

UNITED STATES PATENT OFFICE.

JAMES EDWARD FEENEY, OF MONTEREY, MEXICO.

APPARATUS FOR LUBRICATING THE FLANGES OF VEHICLE-WHEELS.

1,060,174. Specification of Letters Patent. Patented Apr. 29, 1913.

Application filed December 19, 1911. Serial No. 666,756.

*To all whom it may concern:*

Be it known that I, JAMES EDWARD FEENEY, of Monterey, Mexico, have invented certain new and useful Improvements in Apparatus for Lubricating the Flanges of Vehicle-Wheels, of which the following is a specification.

This invention relates to an improved apparatus for lubricating the flanges of vehicle wheels, and has reference to devices employed for the purpose of applying lubricant to the flanges of the wheels of railroad and similar vehicles when said wheels are rounding curves.

The invention consists broadly of a lubricator which is normally inoperative but which when a curve is reached is automatically operated to apply a supply of lubricant to the wheel flange.

The apparatus comprises a fork shaped device having lubricating rollers carried at its forked end and the device as a whole is capable of adjustment relatively to the wheel flange.

The lubricating device aforesaid is connected with a source of lubricant supply and also some source of compressed air which may conveniently be derived from the air brake system when the apparatus is used in a railway vehicle.

Figure 4:
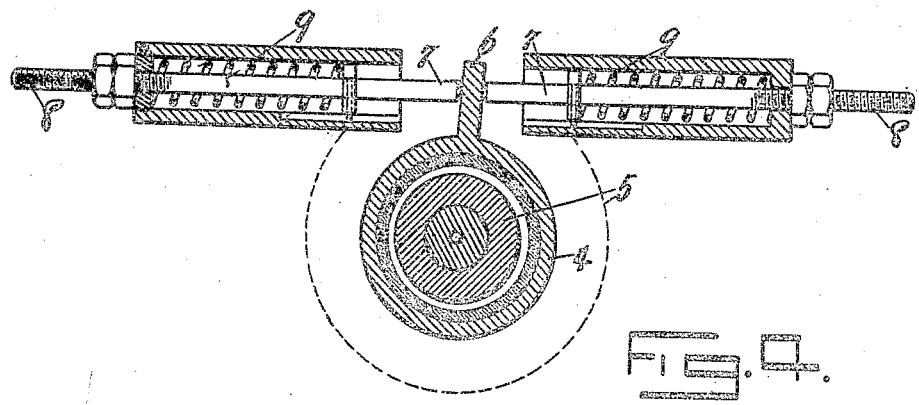
Figure 5:
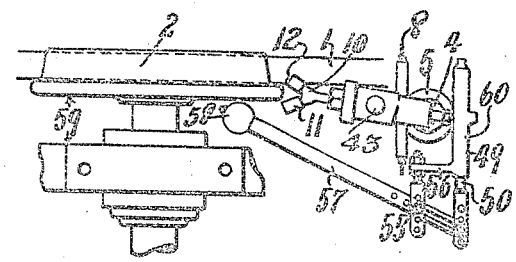
Figure 1:
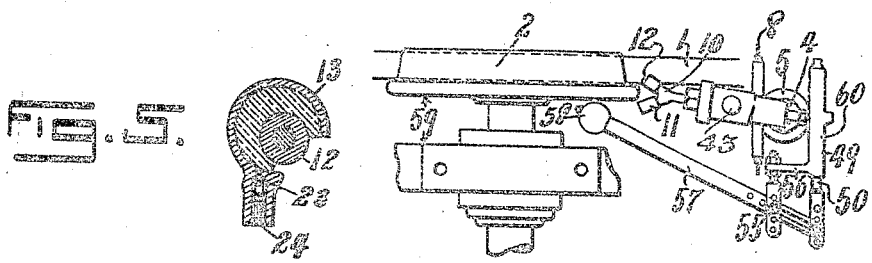
Figure 7:
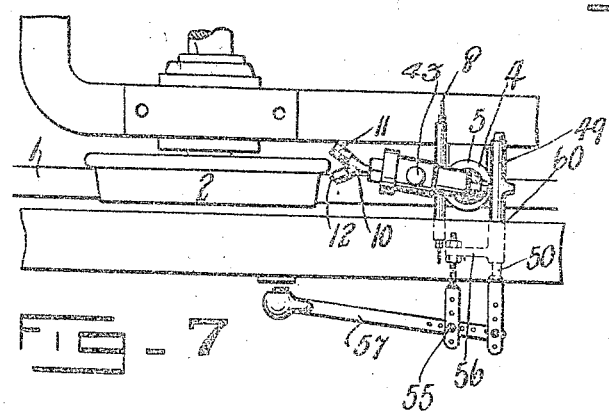

Normally the device is inoperative. That is to say, although there is a flow of lubricant to the interior of the lubricating device there is no supply to the lubricating rollers which are out of contact with the wheel flange. When however a curve is reached a device is automatically operated which opens a valve and enables compressed air to enter the lubricating device and this compressed air operates to carry the forked end of the lubricator into contact with or in close proximity to the wheel flange and also to cause an ejectment of lubricant on to the wheel flange by way of the lubricating rollers aforesaid. When the curve however is passed the whole apparatus reverts to its normal inoperative position and remains in this position until the operation is repeated at another curve. And in order that my said invention may be readily understood and carried into practice, reference is hereby made to the accompanying sheets of drawings wherein:

Figure 1 is a diagrammatic plan view of the apparatus in its inoperative position. Fig. 2 is a horizontal longitudinal section of the apparatus. Fig. 3 is a vertical section thereof. Fig. 4 is a transverse sectional view on line X—X of Fig. 3. Fig. 5 is a section on line Y—Y of Fig. 3 showing the manner in which the lubricating rollers are housed. Fig. 6 is a view of a detail, and Fig. 7 is a diagrammatic plan view illustrating the apparatus designed to be operated by contact with the frame of the vehicle instead of by contact with the vehicle wheel.

Referring to these drawings wherein like numerals of reference indicate corresponding parts wherever occurring the numeral 1 designates a railway track and 2 the wheel of a railway wagon running on the track. On a suitably supported framework 3 carried by the wagon the lubricating device as a whole is carried and is preferably supported pivotally so that the operative end of the lubricator can be adjusted in position relative to the flange of the wheel 2. To this end the supporting boss 4 of the device is rotatable upon the supporting bearing or block 5 secured to the framework, and the boss 4 has a lug or projection 6 which engages between the spring controlled pins 7. One of these pins 7 is screw threaded at its end and this end 8 operates in a tapped opening so that the position of the lug 6 which is always located between the opposing ends of the pins 7 can be regulated at will. Both pins can if desirable be screw-threaded and thus adjustable but it will be readily understood that by adjusting the position of one and permitting the other to move freely under the influence of its spring, the position of the lubricator can be adjusted and the lubricator as a whole will be still capable of yielding. That is to say, it is slightly movable about its pivot in opposition to the spring 9.

The end of the device remote from the pivotal connection, (which includes a cylinder having a relatively enlarged portion 4' and a relatively reduced portion 4'') is formed with two branches 10 and 11 each of which has rotatably mounted in it a lubricating roller 12. These lubricating rollers 12 are normally out of contact with the wheel flange but when the device is operating they make rolling contact with the wheel flange in a manner which will hereafter be explained, and it will be understood that the ability of the whole device to move slightly about its pivotal connection will prevent any undue friction between the rollers 12 and the wheel flange. The housings 13 and 14 in which the lubricating rollers 12 are mounted are connected by oil passages 15 and 16 with a central passage 17 leading to an oil chamber fed from a suitably located supply through the pipe 19, and communication with the rollers 12 is effected by the passages 23 controlled by needle valves 24. The passage 17 has a valve seating 20 at the inner end of its reduced part and a valve 21 is normally closed upon this seating and prevents any accidental leakage of lubricant to the rollers 12. The valve 21 has grooves 22 cut in its periphery to permit of the passage of lubricant from the back to the front of the valve when said valve is off the seating. A valve stem 25 passes centrally through its outer end. Between a shoulder 27 and the packing 28 a compression spring 29 is located. The oil chamber 18 is formed by a hollow piston-like device 30 which is slidable through guides 31 and 32 carried in the main casing of the apparatus and this hollow piston device 30 has a flange 33 and a spring 34 operates between this flange and the guide 31. The piston-like device 30 slides over the cylindrical wall 36 of the passage 17, its movement relative to this cylinder 36 being limited by the pin 37 engaged in the slot 38. A tension spring 39 operates between the end of the cylinder 36 and the wall 40 of the piston device 30. The flange end of the piston device 30 is provided with a fitting ring device 41 which is slidable in the main casing of the apparatus and a stuffing box 42 is provided for the valve stem 25. The numeral 43 indicates the lubricating oil supply which is controlled by the cock 44 and a check valve 45, which latter is provided with peripheral grooves 46 to enable the oil to normally pass into the pipe 19 and thence through the openings 47 and 48 into the chamber 18 formed by the interior of the piston like device 30.

The numeral 49 designates the casing of a compressed air valve which is connected up to a source of compressed air which in the case of railway vehicles may be associated with the air brake system. This valve device comprises a piston 50 slidable in the casing 49, the piston carrying a fitting ring 51. A piston valve 52 controlled by a spring 53 operates in conjunction with a seat 54. The valve is normally shut and the compressed air is thus stopped at the valve. Pivoted at 55 to a bracket 56 projecting from the air valve casing 49 a controlling arm or lever 57 is provided, one end of which arm or lever is pivoted to the outer end of the air valve piston 50 and the other end of this controlling arm carries a roller 58. This roller, which is preferably provided with some automatic form of lubricating device such as that shown by Fig. 6, is normally clear of the wheel 2 as shown in Fig. 1 of the drawings, but when the wheel encounters a curve on the track, the lateral movement of the wheel upon its axle diminishes the space 59 and the wheel contacts with the roller 58 and moves the controlling arm or lever 57 about its pivot 55 and thus the piston 50 is actuated and contacting with the stem of the valve 52 the exhaust port 60 is first closed by the ring 51 covering it and the valve 52 then moves off its seat and compressed air from the chamber 61 is passed by way of the passages 62 and 63 to the chamber 64 formed in the main casing of the apparatus. The piston device 30 is forced out to its maximum travel against the influence of its spring 34 and carries with it all its connections and the lubricating rollers 12 contact with the wheel flange and compression is applied to the tension spring 39, the pin and slot connection 37 and 38 permitting relative movement of the parts and the valve 21 is separated from its seat. The movement of the piston device 30 establishes connection through the passage 65 in the valve stem 25 with the oil chamber 18, it being understood that the valve 21 and its stem are held by the pin 26 contacting with the outer face of the nut or cap 66. The oil in the chamber 18 is now under the pressure of the compressed air and the check valve 45 immediately closes and since the valve 21 is off its seat the lubricating oil is forced through the passages 17 15 and 16 and the openings 23 to the lubricating rollers and the rotation of the wheel 2 causes the flange to be lubricated without any undesirable lubrication of its tread.

Immediately the wheel leaves the curve in the track and reaches a straight part again it will be understood that the roller 58 loses contact with the wheel 2 and the device returns to its normal condition under the influence of its springs. That is to say, the spring 53 returns the piston 52 to its normal position on the seat 54, shutting off the supply of compressed air and causing the piston 50 to move sufficiently to open the exhaust port 60 and thus permit the escape of any compressed air. The air pressure being reduced the springs 34 and 39 return the piston device 30 and its connections including the lubricating rollers to their normal positions away from the wheel 2. The check valve 45 opens and a fresh supply of oil ready for the next operation flows in, it being understood that the cock 44 is normally open. It will also be understood that the particular construction and arrangement hereinbefore described is given merely as a convenient construction and may be varied and modified in various ways within the scope of my claims. For instance, instead of the controlling lever being operated by contact with the wheel, such lever could equally well be operated by contact with some other part of the vehicle, such for instance as by contact with the vehicle frame as shown in Fig. 7.

What I claim as my invention and desire to secure by Letters Patent, is:

1. A wheel flange lubricator comprising in combination, a lubricating device normally inoperative and provided with rotary means adapted for rolling engagement with the wheel flange to apply lubricant thereto and normally out of contact therewith, and means operating upon altered position of the wheel about the track curves for releasing a fluid pressure medium to initiate a flow of the lubricant and engaging said rotary means with the flange to lubricate the same, substantially as described.

2. A wheel flange lubricator comprising in combination, a lubricating device provided with rotary means normally out of rolling engagement with the wheel flange, and mechanism operated when the wheel engages the track curve for releasing a fluid pressure medium to initiate a flow of lubricant to said rotary means and engaging said means with the flange of the wheel, substantially as described.

3. A wheel flange lubricator comprising a lubricating device provided with rotary elements adapted to engage the flange on opposite sides thereof to apply lubricant thereto and normally out of engagement with the flange of the wheel, and mechanism actuated when the wheel strikes a track curve for releasing a fluid pressure medium to initiate a flow of the lubricant and engaging said rotary elements with the flange of the wheel to apply lubricant thereto, substantially as described.

4. A wheel flange lubricator comprising in combination, a lubricating device provided with converging rollers adapted for engagement with opposite sides of the wheel flange, and mechanism actuated when the wheel strikes a curve in the track for initiating a flow of lubricant to said rollers and engaging the same with said flange, substantially as described.

5. A wheel flange lubricator comprising in combination, a swinging lubricator device provided with rollers for applying lubricant to opposite sides of the wheel flange, yielding means for holding said device in a given position, and adjusting mechanism for altering the action of said means, substantially as described.

6. A wheel flange lubricator comprising in combination, a swinging lubricator device provided with rollers for applying lubricant to opposite sides of the wheel flange, opposing yielding means for holding the device in a given position, and adjusting mechanism for altering the action of said means, substantially as described.

7. A wheel flange lubricator comprising in combination, a swinging lubricator device provided with rolling means for applying lubricant to the wheel flange, yielding means for holding said device in a given position, and adjusting mechanism for altering the action of said yielding means, substantially as described.

8. A wheel flange lubricator comprising in combination, a swinging lubricator device provided with elements disposed in diverging relation with respect to each other and adapted to apply lubricant to the wheel flange and lying normally out of engagement therewith, yielding means for holding said elements in a given lateral position, and mechanism for longitudinally moving said elements into engagement with the wheel flange when the wheel strikes a curve, substantially as described.

9. A wheel flange lubricator comprising in combination, a lubricating device normally held in an inoperative position and provided with discharge means for supplying lubricant to the wheel flange, and means operating upon altered position of the wheel about track curves for releasing a fluid pressure medium to move said device into an operative position and initiate a supply of lubricant to the wheel, substantially as described.

10. A wheel flange lubricator comprising in combination, a normally inoperative device for applying lubricant to a wheel flange adapted to receive a continuous supply of lubricant, said device having a normally closed fluid pressure connection for discharging the lubricant therein onto the flange, structural mechanism for simultaneously rendering the device operative and admitting fluid pressure to discharge the lubricant therefrom, and a device actuated by the admitted fluid pressure for shutting off the supply of lubricant, substantially as described.

In testimony whereof I affix my signature in presence of two witnesses.

JAMES EDWARD FEENEY.

Witnesses:
  J. A. ALEGRIA,
  W. J. WIGHTWICK.